May 2, 1961

J. H. WILLIS 2,982,281

STONE CUTTER

Filed Nov. 19, 1957

4 Sheets-Sheet 1

INVENTOR
JAMES H. WILLIS

BY *Ayates Dowell*

ATTORNEY

May 2, 1961 J. H. WILLIS 2,982,281
STONE CUTTER
Filed Nov. 19, 1957 4 Sheets-Sheet 2

INVENTOR
JAMES H. WILLIS

May 2, 1961

J. H. WILLIS 2,982,281

STONE CUTTER

Filed Nov. 19, 1957

4 Sheets-Sheet 3

INVENTOR
JAMES H. WILLIS

BY Ayates Dowell,
ATTORNEY

May 2, 1961
J. H. WILLIS
2,982,281
STONE CUTTER
Filed Nov. 19, 1957
4 Sheets-Sheet 4
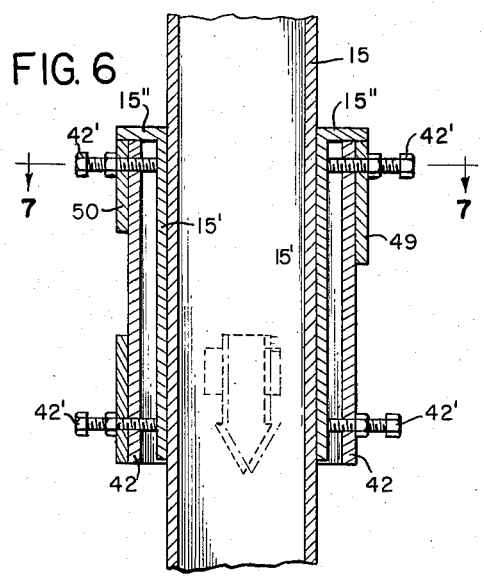
FIG. 6
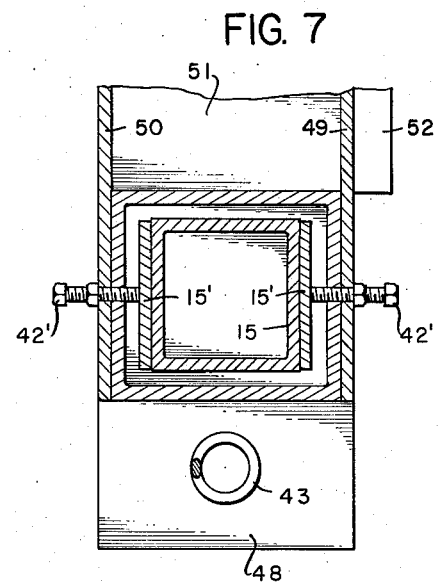
FIG. 7
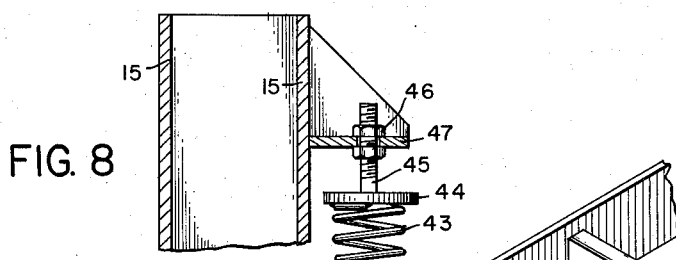
FIG. 8
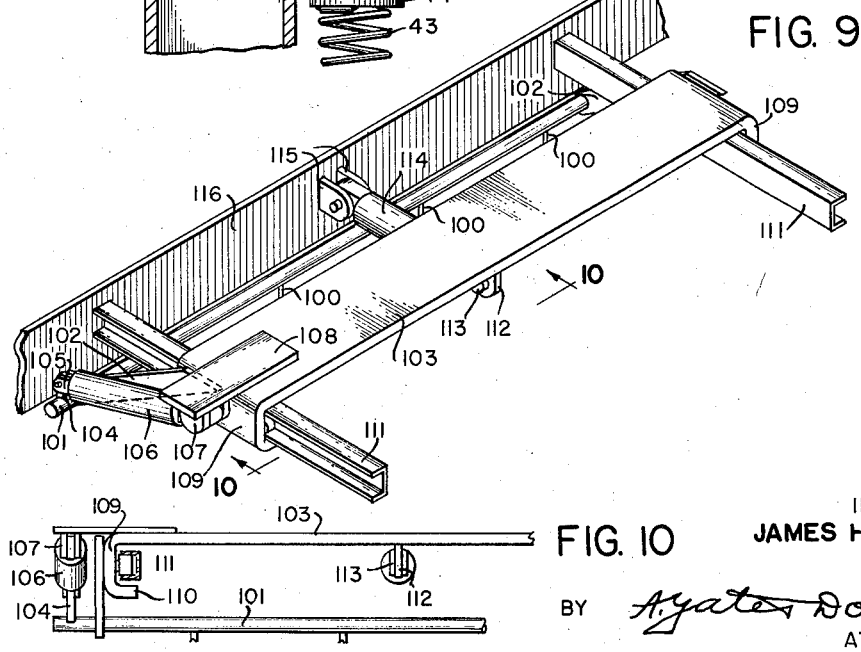
FIG. 9
FIG. 10
INVENTOR
JAMES H. WILLIS
BY A. Yates Dowell
ATTORNEY

United States Patent Office 2,982,281
Patented May 2, 1961

2,982,281
STONE CUTTER
James H. Willis, Box 206, Barling, Ark.
Filed Nov. 19, 1957, Ser. No. 697,423
6 Claims. (Cl. 125—23)

This invention relates to structures created by man in various forms and of numerous materials for both usefulness and beauty including buildings completely or partially of stone, walks, interior and exterior walls, patios and the like, and using stone taken directly from the earth and cut to the desired size and shape.

The invention also relates to equipment employed in the fabrication of such structures and in the preparation of the materials employed especially in the cutting of stone in blocks, slabs and other forms and to the mechanisms for transporting such equipment from the site of one source of supply, where cutting is accomplished, to another.

Heretofore stone cutters of various kinds have been produced and used in the cutting of stone, some of which have been more satisfactory than others, but all of them have failed to have the most desirable characteristics in that they have been complicated, unwieldly, expensive, of limited capacity, required skilled labor to operate and have been difficult to maintain.

It is an object of the invention to correct the deficiencies mentioned and to provide a relatively simple and inexpensive stone cutter capable of being operated without skilled labor and readily transported from one site to another.

Another object of the invention is to provide a stone cutter of improved operating characteristics which will cut stone at a faster rate and more reliably, thus reducing the amount of rejects and consequently the cost per usable unit and which will give service over a relatively long period of time with minimum attention.

A further object of the invention is to provide a stone cutter of greater utility, capable of simple and easy adjustment for cutting stone in various shapes and sizes, including stone of maximum difference in lengths and breadths as well as a machine requiring minimum power in the operation of the same.

Figure 1:
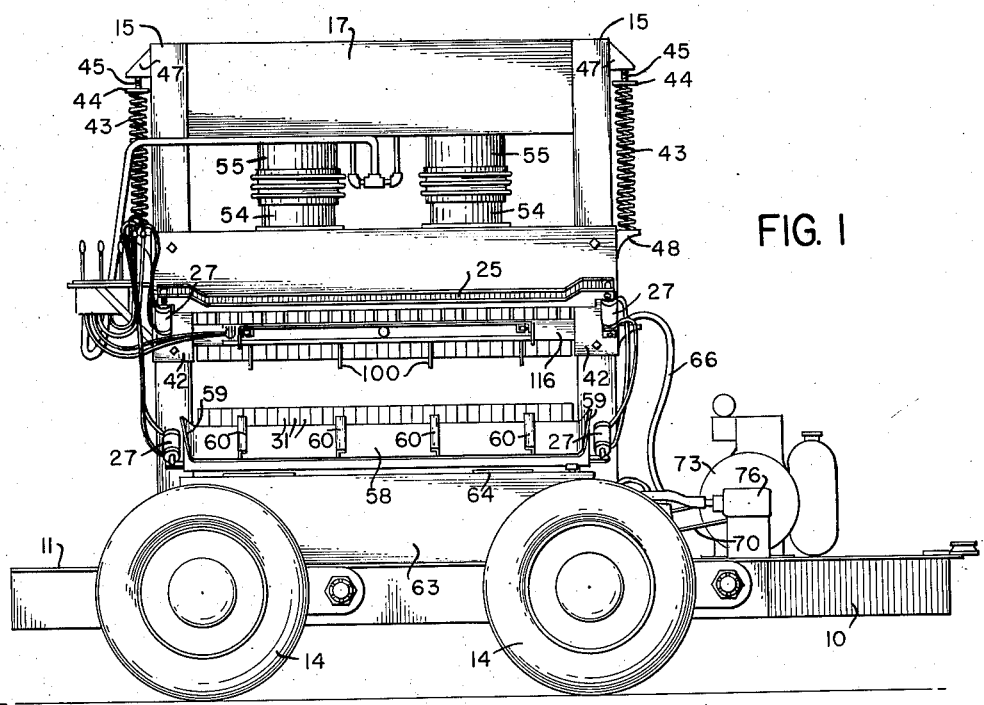
Figure 2:
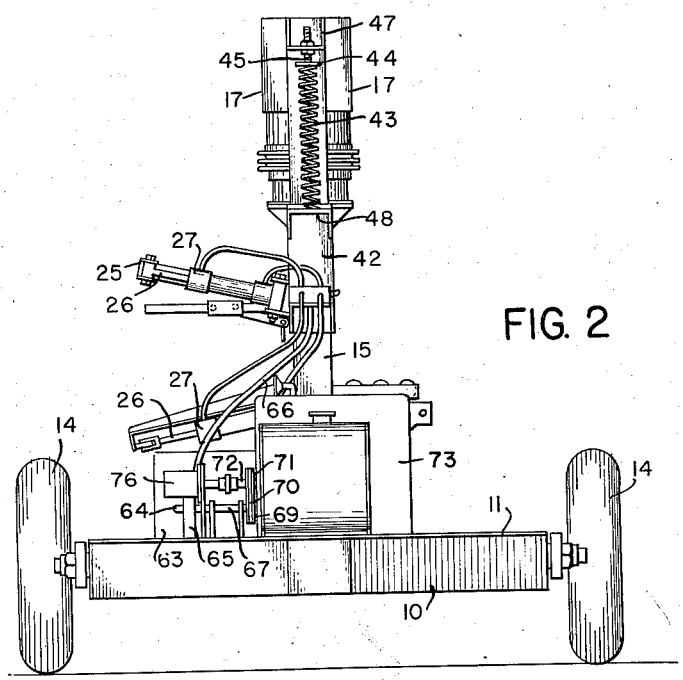
Figure 3:
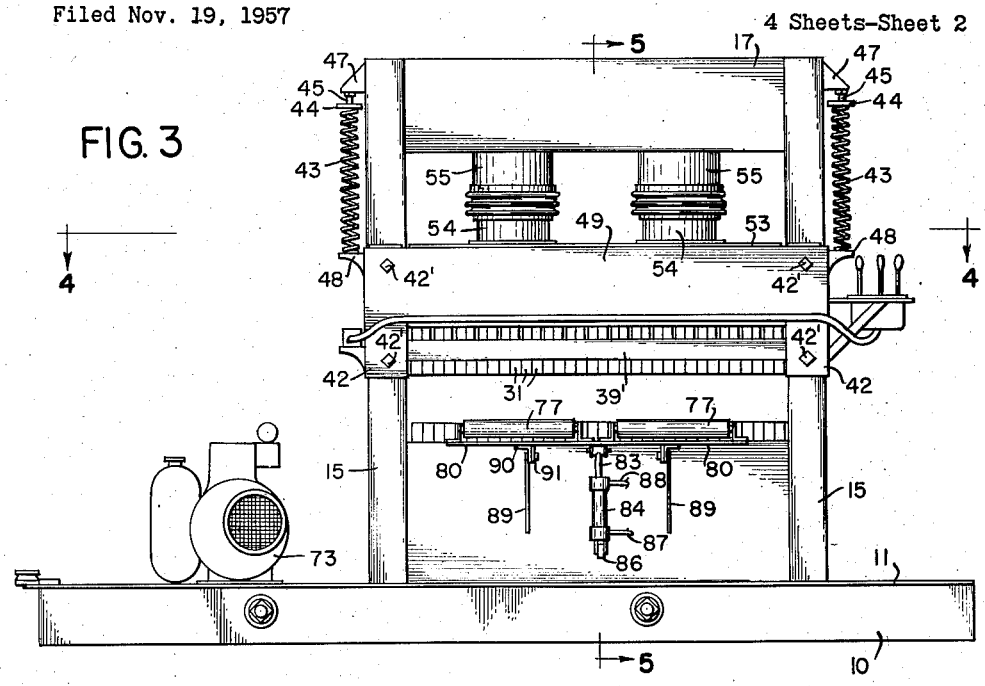
Figure 4:
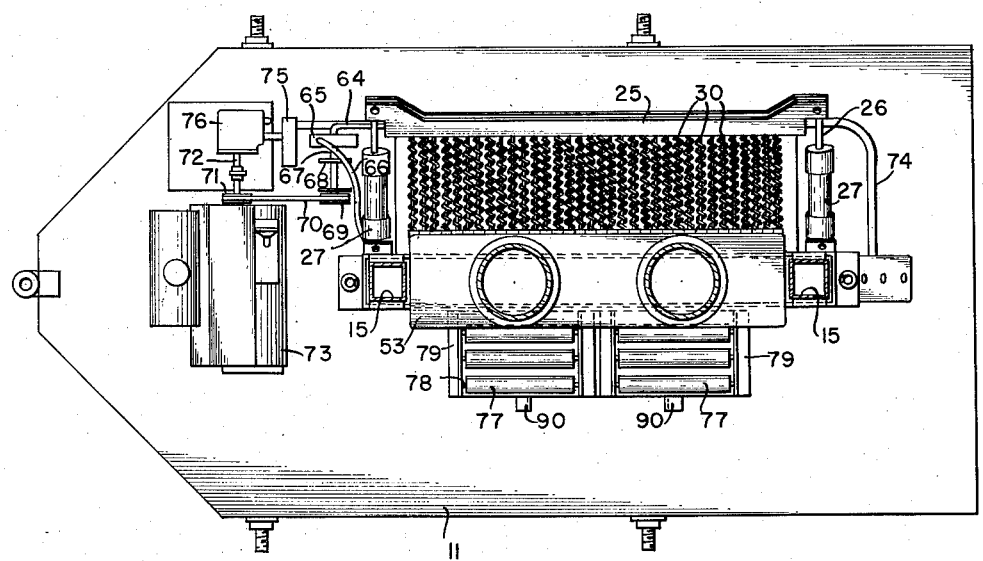
Figure 5:
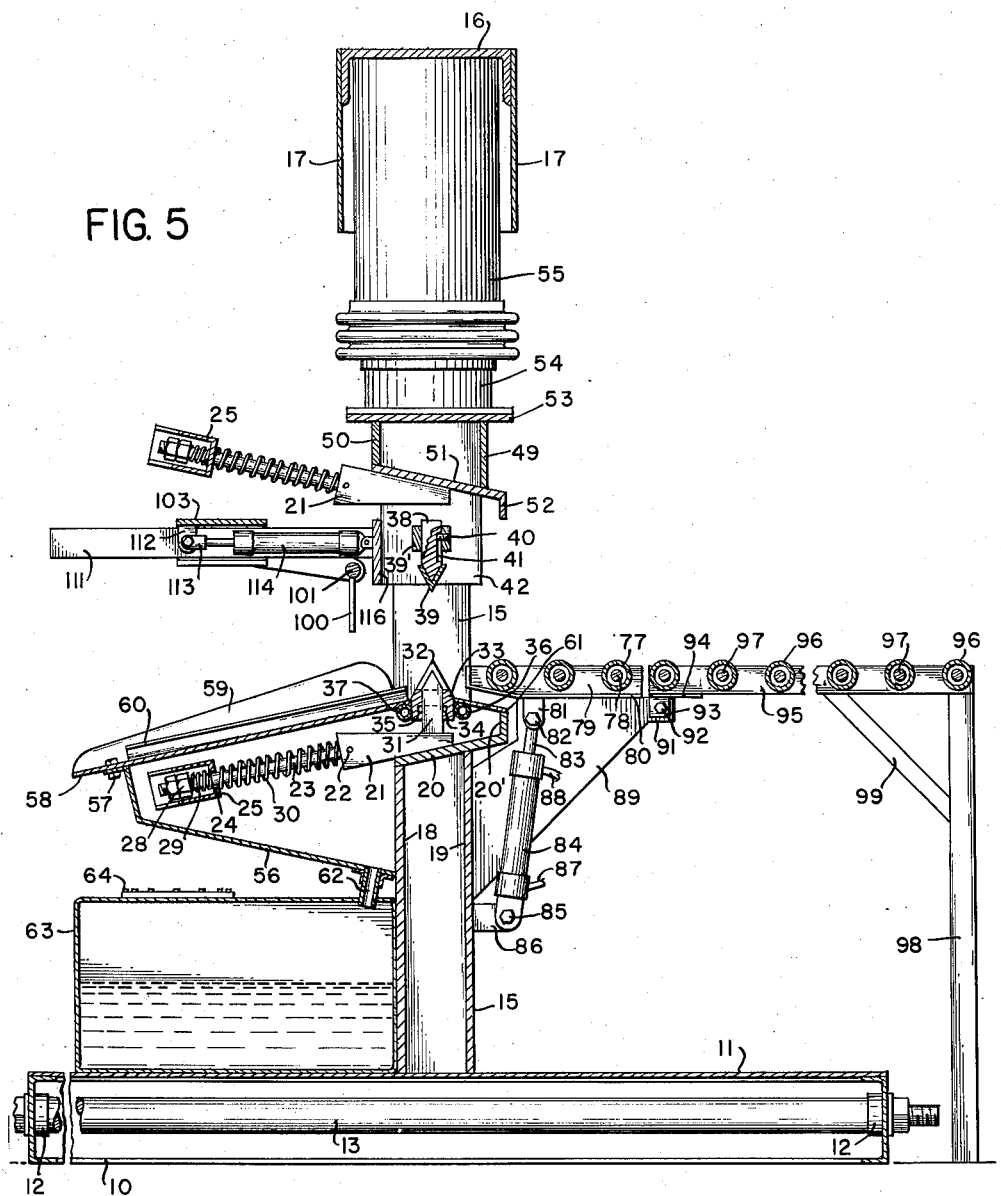

Other objects and advantages of the invention will be apparent from the following description taken in conjunction with the accompanying drawings, in which:

Fig. 1 is an elevation of the invention taken from the right side;
Fig. 2 is a front end elevation;
Fig. 3, an elevation taken from the left side;
Fig. 4, a section on the line 4—4 of Fig. 3;
Fig. 5, a section on the line 5—5 of Fig. 3;
Fig. 6, a section on the line 6—6 of Fig. 3;
Fig. 7, a section on the line 7—7 of Fig. 6;
Fig. 8, an enlarged fragmentary detail on the line 8—8 of Fig. 2;
Fig. 9, an enlarged detailed perspective of the feeder gauge controlling the length of the stone cut;
Fig. 10, a fragmentary enlarged section on the line 10—10 of Fig. 5.

Briefly stated the invention comprises a stone cutter including a base or chassis corresponding to that of a conventional flatbed truck, a frame upon which are mounted upper and lower jaws each composed of a series of independently mounted and operated teeth or cutters between which stone is adapted to be introduced from a conveyor or feed table adjacent the stone cutter, the height of such table being controlled hydraulically and located by hydraulically controlled gauge means for causing the stone to be disposed in the proper position to be cut.

The teeth or cutters are movable relative to the upper and lower jaws in which they are carried, the lower jaw being fixed or immovable while the upper jaw is operated hydraulically from a suitable power plant associated with the machine to perform the cutting operation.

The individual teeth of each jaw are moved into contact with the stone to be cut in such a manner that they exert substantially uniform pressure against the stone regardless of its contour thereby insuring proper fracture of the same.

The adjustment of the cutters in contact with the stone is done by independent wedges mounted under spring tension and hydraulically moved however, and the operation of the machine is accelerated so that less time is required in cutting the stone by the use of relatively short wedges, short springs associated therewith and consequently shorter strokes of the wedges.

When the stone is cut, the projective force of the compression springs of the wedges is absorbed by additional cushioning springs which absorb the shock and the consequent damage which would result from constant pounding together of the machine, particularly the impact between the wedges which move the cutting teeth endwise and the part of crossbar or head in which the shafts of the wedges are disposed.

In order to make it possible to solidly support the machine, means is provided for lowering the frame into contact with the ground when the machine is not being transported from one place to another. This result is accomplished by mounting the wheels at each side of the vehicle to centrally pivoted bell crank levers the free arms of which are connected and fixed to a hydraulic cylinder which may be actuated to move the wheels from a position in which they support the machine to an elevated position in which the machine may be rested upon the ground and the wheels may then be removed and stored until such time as they may be needed.

With continued reference to the drawings, the discharge side of the machine is disclosed in Fig. 1 and the entrance in Fig. 3, Fig. 2 being taken looking from right to left in Fig. 1.

A frame or chassis 10 is provided having a floor or base 11. The frame 10 is provided with bearings 12, in which are mounted axles 13, carried by supporting wheels 14 by which the machine may be transported from place to place.

Upon the base 11 are disposed a pair of spaced hollow posts or uprights 15 preferably square in cross section as disclosed in Figs. 4, 6 and 7. The posts 15 have their upper end portions connected by a cross member in the form of a channel 16 and a pair of side plates 17 attached to such posts. The lower end portions of the posts 15 are connected by cross plates 18 and 19, the upper edges of which are mounted on inclined plate 20 on which a plurality of wedges 21 are slidably supported, such plate having an upturned limiting flange 20.

Each of the wedges 21 is connected by a pivot 22 to a shaft 23 which extends through an aperture 24 in the center portion of a channel shaped member 25 connected for radial movement by means of a pair of pistons 26 in cylinders 27, one at each end of the channel shaped member 25. The rear ends of the shafts 23 are provided with adjustable abutments in the form of lock nuts 28, between which and the member 25 is confined a cushioning spring 29. A correspondingly longer spring 30 may be disposed about the shaft 23 between the rear ends of the wedges 21 and the member 25. The endwise projection of each wedge in one direction will be determined by the pistons 26 in cylinder 27 in conjunction with the strength of the associated spring 30 and upon sudden release of the wedges further forward projection will be cushioned by the compression of the spring 29.

The wedges 21 slide upon the inclined upper surface of the plate 20 and beneath the lower ends of cutting members 31 to move the latter upwardly into contact with the lower surface of the stone to be cut. Thus the wedges 21 are forced beneath the cutting members 31 by the springs 30 when the member 25 is moved closer to the machine by pistons 26 in cylinders 27. The upper ends of the cutting members are beveled and each may have a hardened portion, such as for example, a hard tip 32. The tops of the cutters are of a combined width to provide a continuous cutting edge when they are in horizontal alignment but also are adapted to provide a continuous cutting edge when they are not in such alignment. Thus they are in engagement with the stone to be cut in a continuous line across the same.

The cutting members 31 are slidably mounted in a holder 33 having internal recessed lubricating channels 34 and 35. The opposed sides of the cutting members are adapted to be supplied with a light oil or similar lubricating and washing medium through pipes 36 and 37, so as to wash away small particles and dust in a manner to prevent the stone being cut from becoming stained.

In opposition to the cutting members 31 are cooperating cutting members 38 having hardened tips 39 mounted directly above the tips 32, and such opposed cooperating tips are aligned to come in contact with opposite sides of the stone to be cut. The cutting members 38 are mounted in a holder 39' provided with set screws 40 which extend into channels 41 and prevent the cutting members 38 from dropping out of the holder 39', however permitting endwise movement of the cutting member. The holders 39' are carried at their extremities by sleeves 42 which extend around the posts 15 at each end of the machine. The sleeves 42 are adjustable relative to the posts 15 by means of set screws 42' held in adjusted position by locknuts 42''. The set screws 42' bear against plates 15' provided with outwardly turned flanges 15'' adapted to prevent the plates 15' from falling out by gravity while the set screws are being adjusted to align the upper cutting members 38 with the lower stationary cutting members 31. The sleeves 42 which carry the holders 39' and the cutting members 38 are maintained in elevated position by side springs 43 at each end of the machine. Plates 44 and studs 45 in cooperation with locknuts 46 connect the upper ends of the springs 43 to the horizontal portion of bracket 47 carried by the posts 15 to equalize the upward pressure of the springs 43. Lower ends of the springs 43 are secured to brackets 48 attached to the slidable sleeves 42 at opposite sides of the machine.

The sleeves are connected by plates 49 and 50 beneath which is an inclined plate 51 having a downturned edge or guard portion 52. Across the top of side plates 49 and 50 is mounted a cross plate 53 and between this plate and the top channel member 16 is disposed one or more pistons 54 and cooperating hydraulic cylinders 55 connected to the cross channel 16.

The downwardly directed upper set of cutters 38 in the holder 39 between the sleeves 42 about the posts 15 and the cross plates 49 and 50 with their bottom and top plates 51 and 53 respectively comprise a unit which is moved downwardly by pistons 54 until they are in contact with the stone to be cut and at least one of them is moved upwardly into contact with an overlying wedge 21 of which there are a series in accordance with the number of cutters for engagement with the upper ends of the upper set of cutters in a manner corresponding to the way the lower set of cutters are engaged by underlying wedges. The upper wedges 21 form part of an assembly identical and interchangeable with the lower set. The outer ends of the wedges 21 are supported in a channel member 25 likewise identical with the channel member at the outer ends of the lower wedges, such channel member being mounted in the same manner on pistons 26 carried in cylinders 27. In the lower set the cutters are raised upon the wedges until each cutter is in contact with the stone, while in the upper set the wedges slide beneath the plate 51 when the member 25 is moved closer to the machine by pistons 26 in cylinders 27. Thus the upper wedges back up the cutter to form a solid connection between plate 51 and the cutters 38.

About the lower wedge assembly is deposed a housing or casing for confining washing and lubricating fluid employed to flush away debris from around the bodies of the lower set of cutters and lubricate the wedges 21 as they slide beneath the lower set of cutters on the inclined plate 20. For this purpose, a pan 56 is employed having an inclined lower portion with its inner edge welded or otherwise secured to the cross plate 18 and having its upper end attached in any desired manner, for example, by a bolt and nut 57 to a discharge chute 58. The discharge chute 58 has upturned side flanges 59 and a series of skid forming channel members 60 intermediate such flanges.

The chutes 58 are slightly wider than the total width of the cutters to insure accommodating the maximum amount of stone. The upper end of the chute 58 is welded or otherwise secured to the holder 33 on the discharge side of the machine and a similar relatively short cover plate 61 is provided on the opposite side of the holder, this plate being welded or otherwise secured both to the entrance side of the holder and to the upturned end of the plate 20. Thus, a housing will be provided for the body portions of the lower set of cutters and for the associated wedge assemblies.

Washing and lubricating fluid is collected in the bottom of the housing and a connection in the form of a drain tube 62 is provided in the lower portion of the pan and connected to a tank 63 having an access opening 64, such tank resting upon the base or floor 11. Fluid in the form of light oil is taken from the supply tank or reservoir 63 through the pipe 64 to the pump 65 from which it is forced through a line 66 into conduits 36 and 37 from which it flows into the channels 34 and 35 then downwardly around the cutters and back to the tank 63. The pump is driven from a shaft 67 mounted in bearings 68 driven by a pulley 69 and belt 70 from a pulley 71 which is mounted on the shaft 72 of the engine 73 carried by the trailer. Fluid for the hydraulic system of the stone cutter is supplied through line 74 from a selector valve 75 and hydraulic motor 76.

Stone is adapted to be introduced to the machine from right to left as shown in Fig. 5 and to facilitate the introduction, the machine is provided with a conveyor table comprising a series of rollers 77 on shafts 78 carried between horizontal supports or frame members 79, two pairs of such frame members with rollers between being provided for maximum strength.

Beneath the frame members 79 is a bottom plate 80 which extends beneath both portions of the conveyor table and such plate is connected by a lug 81 and a fastener 82 with a piston 83 extending into a cylinder 84, attached by a fastener 85 and a bracket 86 with the cross plate 19 of the machine.

Hydraulic fluid may be admitted through a line 87 to the lower part of the cylinder to raise the conveyor table attached to the machine, fluid from the upper portion of the cylinder being returned through a line 88. The lowering of the conveyor table thus described is limited by a pair of space brackets 89 attached to the side plates 19, the upper extremities of such angles being provided with bent-over portions 90 (Fig. 3). The lowering of the conveyor table also is limited by brackets 89 so that such conveyor table will never be appreciably below horizontal position and below the tips of the lower teeth.

The brackets 89 are provided with extensions 91 to which are connected by fasteners 92, depending lugs 93 beneath plates 94 on which are supported side members 95 between which are mounted rollers 96 on shafts or axles 97. The outer ends of the side members 95 are supported by legs 98 adapted to rest upon the ground beside the machine. Such legs are fixed to the side members 95 by braces 99. Thus, stone loaded onto the roller conveyor can be easily advanced to a position to be cut.

In order to gauge or determine the position of the stone and the amount of stone to be removed, an adjustable gauge or stop is provided in the form of a series of depending fingers 100 on a shaft 101 pivotally carried by plates 102 welded or otherwise attached to movable cross member 103. One end of the shaft 101 is provided with an upright lug or bracket 104 to which is attached a piston 105 in a hydraulic cylinder 106. The opposite end of the cylinder 106 is carried by a pair of depending lugs on brackets 107 which project below a plate 108 attached to the movable cross member 103.

The movable cross member 103 has downwardly turned flanges 109 and inwardly turned edges 110. Two rollers are attached to the inside surface of each of the flanges 109 for cooperative engagement with a pair of outwardly facing channel members 111. A depending lug or bracket 112 is provided centrally of the movable cross member 103 and a piston 113 in a hydraulic cylinder 114 is attached to such bracket. The opposite end of the cylinder 114 is secured to a pair of brackets 115 which project outwardly from cross plate 116 attached to sleeves 42.

Thus the length of the stone to be cut is determined by simple adjustment of the cylinder 114. After the stone has been moved against the fingers 100 and clamped between the jaws, the cylinder 106 is actuated and the fingers are swung out of the way before the stone is cut.

It will be understood from the foregoing that a stone cutter is provided which is simple and effective to operate by unskilled labor and, on account of its construction, stone can be cut at a rapid rate because of the shorter wedge mechanisms requiring less time for their projection and retraction. The machine will be subjected to less pounding due to the cushioning of the wedges after the cutting or fracturing of the stone thereby not only rendering stone cutting less trying on the operator but greatly enhancing the life of the machine due to the elimination of shock. Also, by using hydraulic means for elevating the roller table, the stone will always be presented at the proper height to the cutters and preventing damage thereto.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A stone cutter comprising a pair of opposed jaws, a plurality of independent cutters carried in each of said jaws, said individual cutters being mounted for engagement with the opposed surfaces of a stone, wedges for adjusting the height of said cutters to conform to the contour of the stone, said wedges being individually spring biased upon a frame, means for moving the wedges and said frame toward said jaws to engage portions of each wedge against the ends of the cutter thereby adjusting the height of the cutters and with said spring biasing allowing each wedge to be placed in individually restrained position, means moving the upper cutters toward the lower cutters for cutting the stone, each wedge having return cushioning means in opposed biased relationship to the first individual spring biasing whereby upon movement of the wedges and frame away from the jaws said spring cushioning means will act to cushion the return of the wedges to their unrestrained position thereby avoiding the associated shock normally attendant to the return, conveyor means for introducing the stone between the individual cutters, and hydraulic means for raising and lowering a portion of said conveyor means immediately adjacent said cutters in a direction vertically and rectilinearly whereby the stone being introduced may be raised to the position where it may be inserted between the cutting surfaces of the cutters without damage to the cutting edges.

2. In a stone cutter a first series of independent cutters disposed side-by-side, a lower jaw supporting said cutters, a second series of independent cutters disposed side-by-side, an upper movable jaw mounting said second series of cutters, a frame in which said jaws are located, means to align said upper jaw and said lower jaw, means tending to maintain said movable jaw in elevated position, hydraulic means for moving said upper jaw toward said lower jaw to cut stone therebetween, hydraulically operated gauge means for limiting the introduction of the stone between said jaws, said gauge means including hydraulically actuated stops movable perpendicularly toward and away from the plane of the cutting stroke of the upper jaw, said frame having inclined surfaces adjacent the remote ends of the cutters of each jaw, wedges having surfaces parallel to said inclined surfaces and other surfaces parallel to the ends of said cutters, means for urging said wedges between said cutters and said inclined surfaces, said wedges being mounted for relatively short longitudinal thrust thereby requiring a minimum of time, cushioning means for the continued thrust of said wedges after the cutting operation has been consummated to thereby avoid shock of said wedges and associated parts of the machine.

3. In a stone cutter a first series of independent cutters disposed side-by-side, a lower jaw supporting said cutters, a second series of independent cutters disposed side-by-side, an upper movable jaw mounting said second series of cutters, a frame in which said jaws are located, means to align said upper jaw and said lower jaw, means tending to maintain said movable jaw in elevated position, hydraulic means for moving said upper jaw toward said lower jaw to cut stone therebetween, hydraulically operated gauge means for limiting the introduction of the stone between said jaws, said gauge means including hydraulically actuated stops movable perpendicular and rectilinearly toward and away for the plane of the cutting stroke movement of the upper jaw whereby said stop may be positioned at a predetermined distance away from the jaws providing a means for determining the desired length of the stone to be cut, said frame having inclined surfaces adjacent the remote ends of the cutters of each jaw, wedges having surfaces parallel to said inclined surfaces and other surfaces parallel to the ends of said cutters, means for urging said wedges between said cutters and said inclined surfaces, said wedges being mounted for relatively short longitudinal thrust thereby requiring a minimum of time.

4. A stone cutter comprising a pair of opposed jaws, independent cutters carried by each of said jaws, wedges for adjusting said cutters for engagement with the surface of the stone to be cut and for the transmission of force during cutting, said wedges being mounted for relatively short endwise movement to accomplish the adjustment in a minimum of time, cushioning means allowing a temporary over travel of each of the wedges upon removal of each of the wedges from engagement with each of the cutters after a stone has been cut, and cushioning means for the continued movement of said wedges in the same direction of movement after the stone has been cut.

5. A stone cutter comprising a pair of opposed jaws, independent cutters carried by each of said jaws, wedges for adjusting said cutters for engagement with the surface of the stone to be cut and for the transmission of force during cutting, said wedges being mounted for relatively short endwise movement to accomplish the adjustment in a minimum of time, means for individually biasing each of said wedges on a frame in two opposed directions, said biasing in said first direction acting to urge the wedges in individual alignment between the cutters to align the cutters according to the conformation of the stone and the second of said biasing means acting to cushion over travel of said wedges upon removal of the wedges from the cutters.

6. The structure of claim 4 in which one of said jaws is adjustable horizontally and transversely to the other jaw for improving its alignment with the other jaw.

References Cited in the file of this patent

UNITED STATES PATENTS

| | | |
|---|---|---|
| 2,152,193 | Johanning | Mar. 28, 1939 |
| 2,723,657 | Jones | Nov. 15, 1955 |
| 2,762,359 | Entz | Sept. 11, 1956 |
| 2,778,354 | Crowl | Jan. 22, 1957 |